Dec. 29, 1936.    N. D. LEVIN    2,065,944

TROLLEY HARP

Filed Feb. 25, 1932

INVENTOR:
Nils D. Levin,
BY Chas. M. Nissen,
ATT'Y.

Patented Dec. 29, 1936

2,065,944

UNITED STATES PATENT OFFICE 2,065,944

TROLLEY HARP

Nils D. Levin, Columbus, Ohio, assignor to The Jeffrey Manufacturing Company, a corporation of Ohio Application February 25, 1932, Serial No. 595,125

7 Claims. (Cl. 308—18)

My invention relates to trolley harps and although particularly adapted to use in mines it may have a general application.

One of the objects of the invention is the provision of rotatably adjustable bearings for a trolley wheel mounted in a harp to prolong the life of such bearings by presenting new bearing surfaces when rotatably adjusted in the harp.

A further object of the invention is the provision of improved and efficient means for adjustably mounting trolley wheel bearings in a harp to maintain effective electrical connection between said harp and said trolley wheel.

More particularly it is the object of the present invention to provide removable spaced-apart bearings for the shaft of a trolley wheel and means for securing such bearings rigidly to a harp in any one of various rotatably adjusted positions to enable new bearing surfaces to be presented for wear whenever adjustment is made and to facilitate renewal of such bearings when desired, while in any adjusted positions of such bearings efficient electrical connection is maintained between the harp and the trolley wheel through the bearings.

Other objects of the invention will appear hereinafter, the novel features and combinations being set forth in the appended claims.

In the accompanying drawing.

Figures 1, 2, 3:
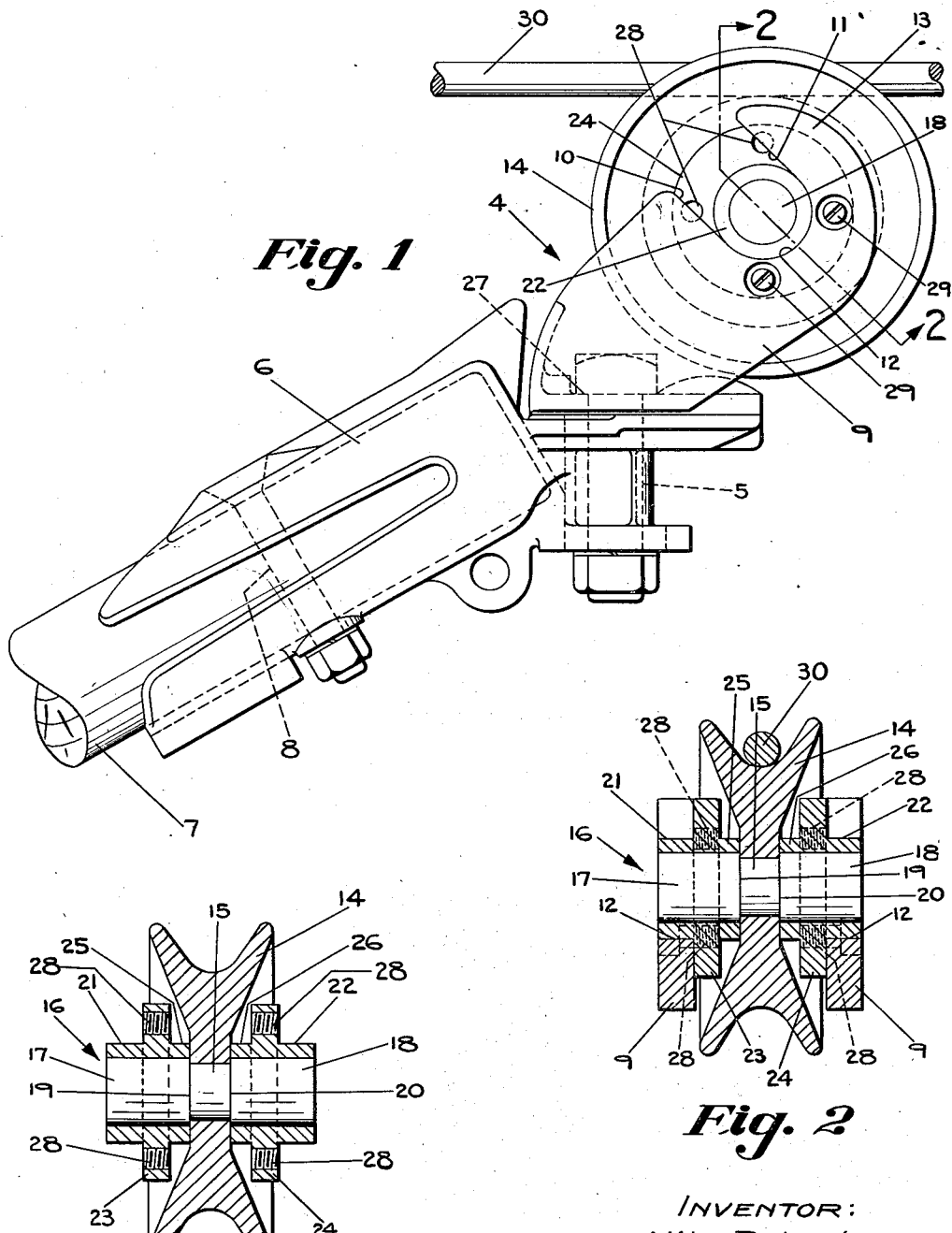
Fig. 1 is an elevation of a trolley harp embodying my invention.
Fig. 2 is a sectional view taken on the line 2—2 of Fig. 1 looking in the direction of the arrows.
Fig. 3 is a sectional view of the bearings and the trolley wheel, removed from the harp.

In Fig. 1 I have shown a trolley harp 4, having spaced-apart upright plates connected by a bottom cross-plate swiveled by means of a pivot bolt 5 to the pole-head 6 of well-known construction. The pole-head 6 is secured to the pole 7 by means of the bolt 8 in the usual manner.

The harp 4 differs from the usual or well-known U-shaped harps in that instead of being provided with cylindrical bearings for a trolley wheel axle, the upright spaced apart standards or plates 9 are each provided with diagonally extending pockets or U-shaped recesses each having opposite parallel walls 10, 11 and a semi-circular bottom 12. It will thus be seen that each vertical plate 9 of the harp 4 is provided with an upwardly extending finger 13 to form hooks having inner parallel spaced-apart opposite walls 10, 11 and a supporting semi-circular recess 12.

The trolley wheel 14 is preferably cast about the intermediate portion 15 of the shaft 16. The shaft 16 may be previously constructed to have the bearings 17, 18 with the intermediate portion 15 of reduced diameter so that when such shaft is placed in a mold and the trolley wheel 14 cast around the same the wheel will be between the annular shoulders 19 and 20 at the central portion of the shaft 16. The shaft 16 is therefore rigidly and permanently connected to the trolley wheel 14 to rotate therewith.

Journal bearings for the stud shafts 17, 18 comprise sleeves 21, 22 which are adapted to be slid axially onto the shafts and against the sides of the trolley wheel as shown in Fig. 2. Intermediate the ends of the sleeve 21 is an annular collar 23 and likewise intermediate the ends of the sleeve 22 is an annular collar 24. The inner ends 25, 26 of the sleeves 21, 22 serve as spacers to keep the collars 23 and 24 spaced from and out of contact with the trolley wheel 14.

The outer ends of the sleeves 21 and 22 are of such diameter as to fit closely the semi-circular sockets 12, 12 in the hook plates 9, 9. The plates 9, 9 themselves are rigidly connected by the swiveled cross-plate 27 in such spaced-apart positions that the collars 23, 24 fit against the inner sides of such plates as shown in Fig. 2. Consequently when the sleeves and collars are in assembled relation to the trolley wheel they form with the latter a unit adapted to be dropped into the sockets 12, 12 in the vertical hook plates 9, 9 with the assurance that such unit will not become displaced when released, because the collars 23, 24 fit against the inner sides of the plates 9, 9 and the central portion of the trolley wheel abuts against the inner ends of the sleeves. It will thus be seen that when the unit comprising the trolley wheel, shafts and journal bearings, is dropped into place in the harp 4, the trolley wheel will be restrained from moving axially by the ends 25, 26 and collars 23, 24 which intervene as abutments between the trolley wheel and the plates 9, 9.

Now in order to detachably secure the sleeves 21, 22 to the harp plates 9, 9 to form stationary journal bearings for the stud shafts 17, 18, I have provided a plurality of screw-threaded apertures 28, 28 in the collars 23, 24, circumferentially spaced and located in a circumference outside of the circumference of the sleeves 21, 22. The plates 9, 9 are provided with openings registering with some of the apertures 28. Cap screws 29, 29 extend through the openings in the plates 9, 9 and are adapted to be screw-threaded into the apertures 28 so as to secure the sleeves 21, 22 together with the collars 23, 24 rigidly to the plates 9, 9.

While in the drawing only four apertures 28 are shown in each collar and only two cap screws extending through two openings in each plate 9, it should be understood that there may be any desired number of such apertures, openings and screws for each plate and its corresponding collar. In order to prolong the life of the bearings 21, 22 they are adjusted rotatably to new positions from time to time to present new bearing surfaces on the undersides of the stud shafts where the greatest pressure is exerted when the trolley pole is pressed upwardly to keep the trolley wheel 14 in firm operating contact with the trolley wire 30. In the structure shown the journal bearings can be released by removing the screws 29 and shifted ninety degrees to new positions and then secured in adjusted positions by replacing the screws 29. Such adjustments may be repeated several times before it will become advisable to renew the journal bearings. Renewals, however, may be effected very quickly and easily because after the screws 29 are removed, the trolley wheel, shafts and bearings may be lifted from the harp and new bearings substituted for those worn out, after which the parts may be again secured to the harp as explained above.

It should be particularly noted that the construction shown in the drawings and above described affords a very efficient electrical connection between the harp and trolley wheel making unnecessary any additional parts. The area of the direct electrical contact between the trolley wheel and the harp through the ends 25, 26 of the sleeves 21, 22 and the collars 23, 24 is distributed over two rings at the sides of the trolley wheel near the reduced portion 15 of the shaft 16. The trolley wheel itself is cast into direct electrical contact at 15 with the shaft 16 between the annular shoulders 19, 20. By the use of an electrically conducting lubricant such as graphite for the journal bearings the electrical resistance between the trolley wheel and the harp through the bearings is kept very low. Therefore, even after the inner ends of the sleeves become worn away after long use of the trolley wheel under practical conditions arcing will still be prevented by the low resistance shunt paths through the journal bearings to the harp plates.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:—

1. In a trolley harp, the combination with spaced supports, each having a semi-circular socket, of a trolley wheel, stud shafts extending from opposite sides of said trolley wheel, journal bearings adapted to be slid axially onto said stud shafts against opposite sides of said trolley wheel, annular collars on said journal bearings intermediate the ends thereof in position to engage and fit the inner faces of said supports when said journal bearings at their inner ends abut against opposite sides of said trolley wheel while the outer end portions of said journal bearings fit in said semi-circular sockets and means for securing said journal bearings to said spaced supports.

2. In a trolley harp, the combination with spaced-apart supports, of a trolley wheel, a shaft for the wheel comprising stud shafts and an intermediate portion connecting the stud shafts, the wheel being cast on the intermediate portion, cylindrical journal bearings for said stud shafts, sockets in said supports for receiving said journal bearings, and means for detachably securing said bearings to said supports in any one of a plurality of angular positions relative to the axis of the trolley wheel, the said means including attaching collars integral with the bearings.

3. In a trolley harp, the combination with spaced supports, of a trolley wheel, one piece tubular bearings spanning the spaces between said supports and opposite sides of said trolley wheel, integral collars on said bearings intermediate the ends thereof, and means for securing said collars to said supports and holding said bearings in position to serve as non-flexible electrical conductors simultaneously engaging opposite faces of the trolley wheel to afford electrical connections between said trolley wheel and said spaced supports.

4. In a trolley harp, the combination with spaced supports each having a semi-circular socket, of a trolley wheel, stud shafts extending from opposite sides of said trolley wheel, journal bearings adapted to be slid axially onto said stud shafts against opposite sides of said trolley wheel and adjustable in said sockets on the axis of said trolley wheel, and means for securing said journal bearings in adjusted positions to said supports.

5. In a trolley harp, the combination with spaced supports, of a trolley wheel, shafts therefor, journal bearings for said shafts, and means comprising circumferential collars on said journal bearings between said supports in position to fit against the inner sides of the supports and threaded openings through the collars adapted to receive threaded fastening members for securing said journal bearings in rotatably adjusted positions to said supports.

6. In a trolley harp, the combination with spaced supports, of a trolley wheel, a shaft rigidly and irremovably secured thereto and extending from opposite faces thereof, journal bearings for said shaft on opposite sides of said trolley wheel, said journal bearings having central bores into which said shaft extends, collars integral with said journal bearings intermediate the ends thereof in position to engage the inner sides of said spaced supports, and means for removably securing said journal bearings to said spaced supports.

7. In a trolley harp, the combination with spaced supports, of a trolley wheel, stud shafts on opposite sides thereof, a restricted shaft portion interconnecting the stud shafts, the trolley wheel being rigidly attached to the restricted shaft portion, the stud shafts closely engaging the opposite sides of the trolley wheel, one piece removable tubular bearings for said shafts spanning the space between said supports and the opposite sides of said trolley wheel to serve as rigid electrical connections between opposite sides of said trolley wheel and said supports, and means spaced from the axis of said trolley wheel for securing said tubular bearings rigidly to said supports.

NILS D. LEVIN.